United States Patent [19]

Lars

[11] Patent Number: 5,501,307
[45] Date of Patent: Mar. 26, 1996

[54] SHOCK ABSORBER

[75] Inventor: Sonsterod Lars, Upplands Vesby, Sweden

[73] Assignee: Yamaha Hatsudoki Kabushiki Kaisha, Iwata, Japan

[21] Appl. No.: 211,872

[22] PCT Filed: Oct. 23, 1992

[86] PCT No.: PCT/JP92/01383

§ 371 Date: Apr. 22, 1994

§ 102(e) Date: Apr. 22, 1994

[87] PCT Pub. No.: WO93/08416

PCT Pub. Date: Apr. 29, 1993

[30] Foreign Application Priority Data

Oct. 24, 1991 [JP] Japan ................... 3-303880

[51] Int. Cl.$^6$ ................................................... F16F 5/00
[52] U.S. Cl. ..................................................... 188/319
[58] Field of Search ............................. 188/299, 319, 188/322.15, 285, 282, 289, 281; 251/30.03, 30.05, 38; 280/707

[56] References Cited

U.S. PATENT DOCUMENTS

| | | |
|---|---|---|
| 4,997,068 | 3/1991 | Ashiba ................... 188/319 |
| 5,044,474 | 9/1991 | De Kock . |
| 5,078,240 | 1/1992 | Ackermann et al. ........... 188/322.15 |
| 5,129,489 | 7/1992 | Majima ................... 188/319 |

Primary Examiner—Robert J. Oberleitner
Assistant Examiner—C. T. Bartz
Attorney, Agent, or Firm—Knobbe, Martens, Olson & Bear

[57] ABSTRACT

In the shock absorber wherein the operation of the main valve for opening and closing a main oil channel by the action of the energizing current flowing through a linear solenoid thereby to control the damping power, an improvement in the response property of the main valve responsive to the change in moving amout of the piston or change in the set thrusting power of the linear solenoid.

The shock absorber comprises a main chamber facing to one end of the main valve so as to transmit the hydraulic pressure in the high pressure side main oil chamber for biasing said main valve toward the direction for opening said main oil channel, a pilot chamber facing to the other end of said main valve, a pilot valve for receiving the pressure in the main chamber to be opened to release the pressure in said pilot chamber to the low pressure side main oil chamber, a linear solenoid for biasing the pilot valve to the closing direction, a variable orifice having a variable opening area varied by the relative movement of said pilot and main valves, a pilot flow channel extending from said main chamber through the variable orifice and through the pilot valve to the low pressure side main oil chamber.

31 Claims, 8 Drawing Sheets

SHOCK ABSORBER

BACKGROUND OF THE INVENTION

The present invention relates to a shock absorber by which the damping power thereof is controlled by the electric current for energizing the linear solenoid.

In the shock absorber used on vehicles, such as automobiles, motor bicycles or like, it is desirous that the damping power thereof is freely varied depending on the cruising conditions. For example, a system has been made known to the public, wherein the amount and rate of expansion or compression are detected so that the pressure for actuating a main valve, which is provided in the piston for opening and closing the oil passage, is freely varied by controlling energization of the linear solenoid continuously or discontinuously during each stroke of the piston (for example, by Unexamined Japanese Patent Publication No. 261528/1989 (corresponding to U.S. Pat. No. 5,090,525 and European Patent Publication No. 0330634A)).

The shock absorber used therein has the construction as shown in the schematic principle in FIG. 1. The shock absorber comprises a piston 16 for defining two main oil chambers 12, 14 in a cylinder 10, a main valve 22 provided in the piston 16 for defining a main chamber 18 and a pilot chamber 20, and an orifice 24 interposed between these main and pilot chambers 18, 20. The hydraulic pressure in the high pressure side main oil chamber 12 or 14 is transmitted to the main chamber 18. On the other hand, as the internal pressure in the pilot chamber 20 exceeds the thrusting power set by a linear solenoid 26, said main valve 22 is moved to open a main oil channel 28 (28a, 28b), which communicates with the two main oil chambers 12, 14, so as to control the damping power. Meanwhile, the in interior side of the main oil channel 28a is defined to be annular to surround the outer periphery of the main valve 22.

In this preceedingly proposed system, the pressure in the high pressure side main oil chamber 12 or 14 is transmitted through the main chamber 18 and the orifice 24 to the pilot chamber 20. And, when the pressure in this pilot chamber 20 (Pilot Chamber Pressure $P_p$) exceeds the set thrusting power $P_s$ of the linear solenoid 26 a pilot valve 30 is opened. Then, under the action of pressure drop upon passage of fluid medium through the such orifice 24 and opening of the pilot valve 30, the pilot chamber pressure $P_p$ at the downstream of the orifice 24 becomes lower than the pressure in the main chamber 18 (Main Chamber Pressure $P_m$). Thus caused pressure difference ($P_m$–$P_p$) urges the main valve 22 to move upwards. Reference numeral 31 designates a spring to restore the main valve 22.

Since the pilot valve 30 is opened the pilot chamber pressure $P_p$, as described above, the increment of the pilot chamber pressure $P_p$ is delayed owing to the interposition of the orifice 24. Such delayed response arises a problem that the response of the main valve 22 to the change in set thrusting power $P_s$ of the linear solenoid 26 is delayed.

In order to provide a quicker response in dumping the pressure in the pilot chamber, the inventor has proposed to provide the pilot valve with a valve shaft extension that passes through the main valve and is exposed to the pressure in the main chamber. This arrangement permits a more rapid opening of the pilot valve when the pressure exceeds the force of the linear solenoid. In order to improve this operation, it is necessary to provide a restrictive orifice in the conduit connecting the main chamber to the pilot chamber. Because of this orifice, there is a delay in the return motion of the main piston.

Another feature of the invention has been accomplished in view of the circumstances as aforementioned, and the object thereof is to provide a shock absorber by which the response property of the main valve responsive to change in movement of the piston or change in set thrusting power of the linear solenoid is improved.

As has been noted, a linear solenoid is employed with the constructions for holding the pilot valve in its closed position. The force necessary to cause opening of the control valve varies by varying the power applied to the solenoid and in this way the operation of the shock absorber can be very effectively controlled. However, if there is a malfunction in the electrical operation, then the operation of the shock absorber becomes uncontrolled.

It is, therefore, a still further object of the invention to provide an improved shock absorber of this type wherein the shock absorbing function can revert to a manual control in the event of an electrical failure.

SUMMARY OF THE INVENTION

According to a first feature of the invention, the aforementioned object is attained by the provision of a shock absorber characterised by comprising a piston for defining two main oil chambers in a cylinder, a main oil channel for communicating said two main oil chambers, a main valve for opening and closing the main oil channel, a main chamber facing to one end of the main valve so as to transmit the hydraulic pressure in the high pressure side main oil chamber for biasing said main valve toward the direction for opening said main oil channel, a pilot chamber facing to the other end of said main valve, a pilot valve for receiving the pressure in the main chamber to be opened to release the pressure in said pilot chamber to the low pressure side main oil chamber, a linear solenoid for biasing the pilot valve toward the closing direction, a variable orifice having a variable opening area varied by the relative movement of said pilot and main valves, and a pilot flow channel extending from said main chamber through the variable orifice and through the pilot valve to the low pressure side main oil chamber.

Meantime, a valve shaft extending through the main valve to have one end facing to the main chamber and biased by the linear solenoid may be provided so that a variable orifice is formed by a passage provided through the valve shaft and the main valve. A fixed orifice may be provided additionally in this passage.

The main chamber, to which the one end of the main valve is faced, may be an isolated chamber to which the pressure in the high pressure side main oil chamber is transmitted through a one-way valve. However, the main valve may have one end provided with an annular stepped portion and an end face directly facing to one of the main oil chambers while the pressure in the other main oil chamber is transmitted to the stepped portion. In such a case, it is desirous that the pressure-bearing areas of the stepped portion and the end face should be differentiated from each other. Alternatively, a main pressure chamber may be formed in a cylindrical body which extends through the main valve, so that a variable orifice is provided by a pin, which extends from the such main pressure chamber through the pilot chamber to abut against the valve body, and the cylindrical body.

Another feature of the invention is also adapted to be embodied in a shock absorber that is comprised of a pair of relatively movable components defining a first fluid chamber. A second fluid chamber is also provided and a first conduit interconnects the fluid chambers for flow therebetween and includes a control valve for controlling the flow through the first conduit. The control valve has a first surface exposed to pressure in the first fluid chamber and a second surface opposed to the first surface and exposed to the pressure in a pilot chamber. A pilot valve selectively communicates the pilot chamber with a lower pressure area. A linear electrical solenoid applies a predetermined closing force on the pilot valve. A second conduit containing a variable orifice interconnects the first fluid chamber to the pilot chamber for transmitting pressure thereto. The effective area of the variable orifice is controlled by the position of at least one of the valves.

Another feature of the invention is adapted to be embodied in a shock absorber comprised of a pair of relatively movable components defining a first fluid chamber. A second fluid chamber is interconnected to the first fluid chamber by a first conduit which includes a control valve for controlling the flow through the first conduit. The control valve has a first surface exposed to the pressure in the first fluid chamber and a second surface opposed to the first surface and exposed to the pressure in a pilot chamber. A pilot valve selectively communicates the pilot chamber with a lower pressure area. A linear electrical solenoid applies a predetermined closing force upon the pilot valve. A second conduit interconnects the first fluid chamber to the pilot chamber for transmitting pressure therebetween and an orifice is provided in this second conduit. A portion of the pilot valve extends through the control valve and is exposed to the pressure in the first fluid chamber for urging the pilot valve toward an open position in opposition to the force of the linear electrical solenoid.

A yet further feature of the invention is also adapted to be embodied in a shock absorber comprised of a pair of relatively movable components defining a first fluid chamber. A second fluid chamber is interconnected with the first fluid chamber for flow therebetween by a first conduit in which a control valve is provided for controlling the flow through the first conduit. The control valve has a first surface exposed to the pressure in the first fluid chamber and a second surface opposed to the first surface and exposed to the pressure in a pilot chamber. A pilot valve is provided for selectively communicating the pilot chamber with a lower pressure area. A linear electrical solenoid applies a predetermined closing force upon the pilot valve. A second conduit interconnects the first fluid chamber to the pilot chamber for transmitting pressure therebetween. A biasing spring is provided in for urging the pilot valve to a closed position for maintaining a predetermined opening force for the pilot valve in the event the linear electric solenoid becomes inoperative.

SUMMARY OF THE INVENTION

Figure 1:
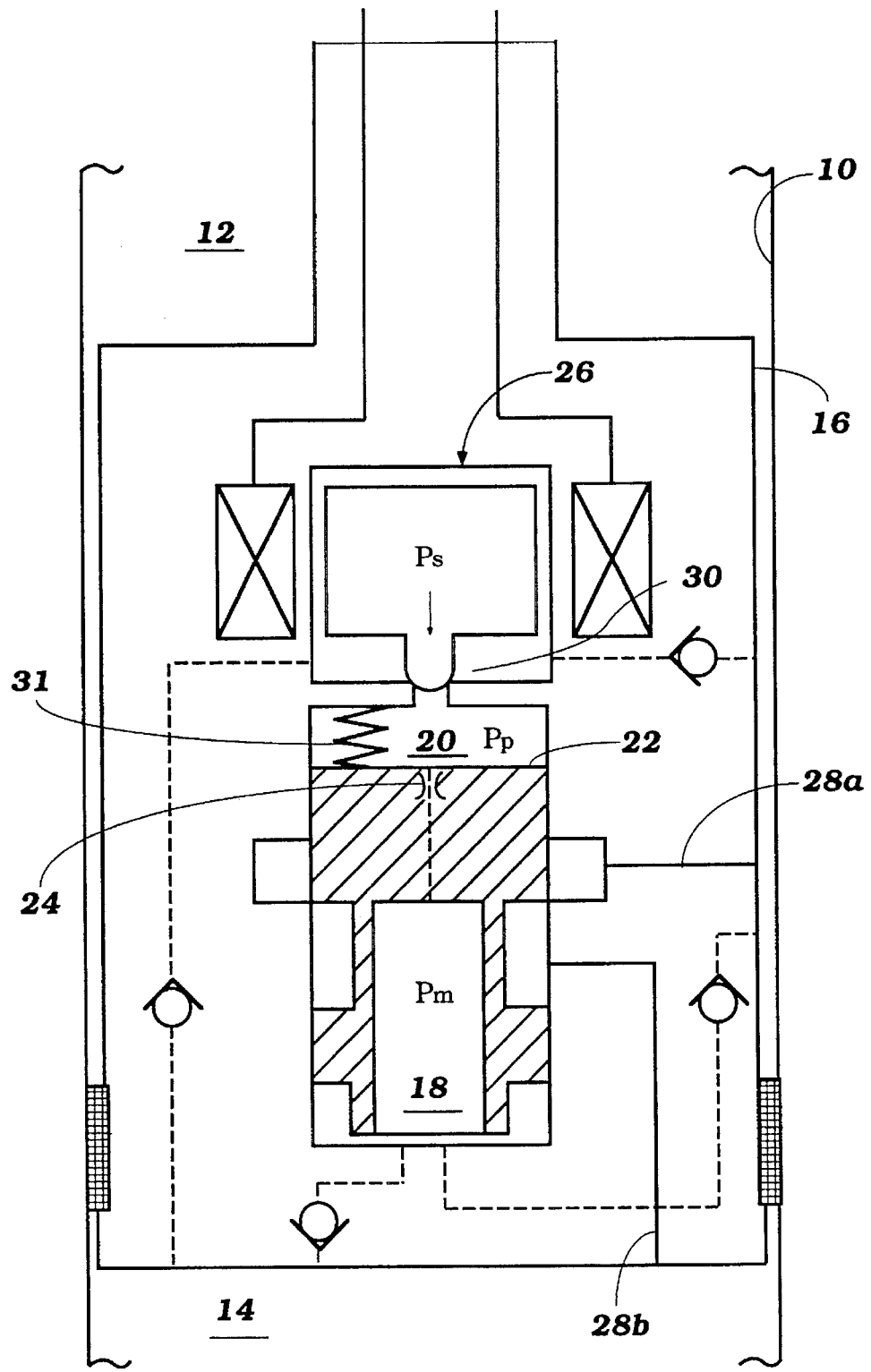
FIG. 1 is a cross-sectional view showing a shock absorber partially in schematic form and constructed in accordance with the prior art.
Figure 2:
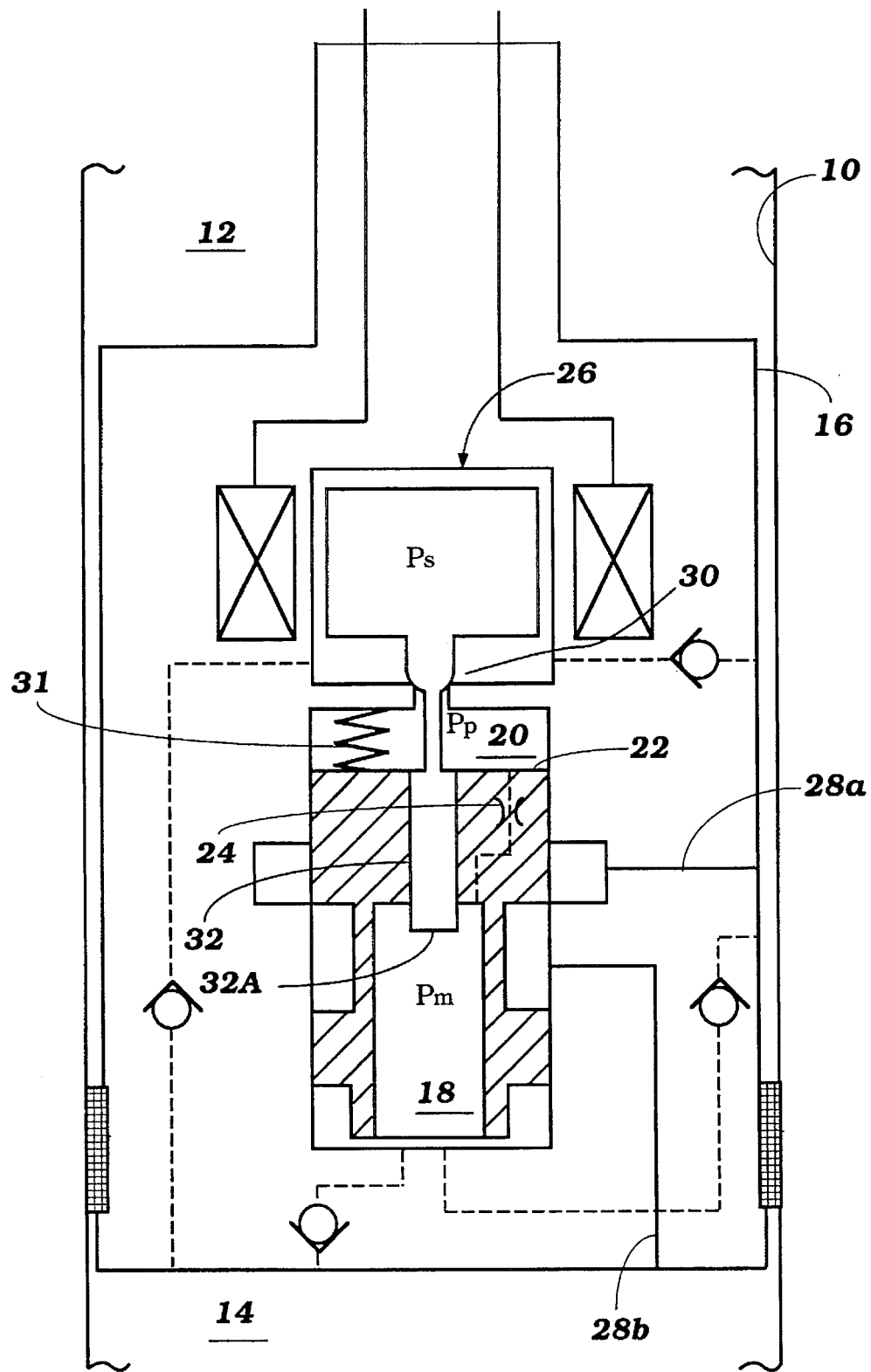
FIG. 2 is a partially schematic cross-sectional view, in part similar to FIG. 1, and shows a first embodiment of the invention.

A first embodiment of the invention is shown in FIG. 2 and includes many of the components of the prior art type of construction. Where that is the case, those components have been identified by the same reference numerals as applied in FIG. 1 and will not be described again, except insofar as is necessary to understand the construction and operation of this embodiment. This embodiment is intended to improve upon the construction of the prior art by increasing the responsiveness of the opening of the pilot valve.

As shown, a valve shaft 32 is provided integrally with the plunger of the solenoid 26 on the pilot valve 30 so that the valve shaft 32 extends through the pilot chamber 20 and the main valve 22 to be faced or exposed to the main chamber 18. The main valve 22 is endowed with a restoring force to close the main oil channel 28 by the action of a spring 31.

In this construction, the pressure in the high pressure side main oil chamber 12 or 14 acts from the main chamber 18 to the bottom end face 32A of the valve shaft 32 directly. As the result, the response speed of the main valve 22 responsive to the change in set thrusting power of the linear solenoid 26 can be increased as compared to the construction shown in the prior art FIG. 1. However, with this construction, when a sufficiently narrow orifice is provided to intensify the pressure reduction effect by the orifice 24 in order to improve the response speed at the step of raising the piston, the oil flow from the main chamber 18 to the pilot chamber 20 is blocked, so that restoration of the main valve 22 is retarded to result in poor response property at the restoring step. On the contrary, when the orifice 24 be broader, sufficient pressure different $(P_m-P_p)$ is not generated to result in poor response property at the raising step.

Figure 3:
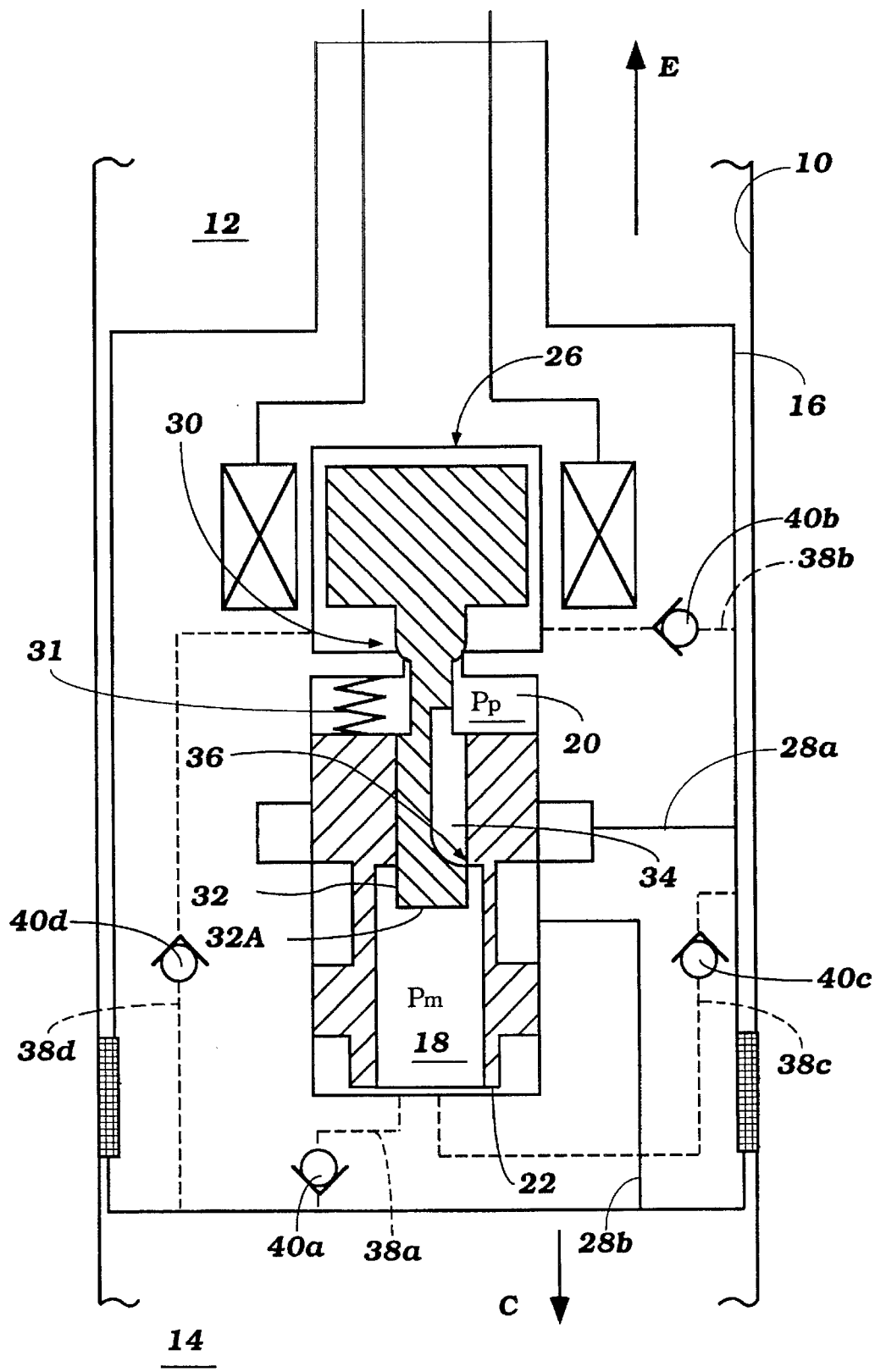
FIG. 3 is a partially schematic cross-sectional view, in part similar to FIGS. 1 and 2, and shows a second embodiment of the invention.

The difficulties in accordance with the construction of the embodiments shown in FIG. 2 can be avoided by providing a variable orifice interconnecting the main chamber 18 and the pilot chamber 20 and a first way in which this can be accomplished is shown in FIG. 3.

In this embodiment, a valve shaft 32 formed integrally with the plunger of a solenoid 26 is provided with a passage 34 which is elongated along the axial direction. The lower end of the passage 34 is opened on the outer periphery of the valve shaft 32 to form a variable orifice 36 in cooperation with an opening provided on the side of the main valve 22. Thus, the variable orifice 36 has an opening area which is decreased upon rising of the valve shaft 32 or upon lowering of the main valve 22. The top end of the passage 34 is opened to the pilot chamber 20.

The opening area of the variable orifice 36 is set to have a predetermined area in the condition as shown in the Figure where the valve shaft 32 closes the pilot valve 30 and the main valve 22 closes the main oil channel 28.

In this Figure, a pilot flow channel 38 (38a to 38d) is shown by the broken line, and one-way valves 40 (40a to 40d) are interposed respectively on the flow channels 38a to 38d.

Accordingly, when a force in the compressing direction (the direction shown by the arrow C) is applied to the piston 16 in the condition as shown in FIG. 1, the pressure in the high pressure side main oil chamber 14 is applied through the pilot flow channel 38a, the one-way valve 40a and the main chamber 18 to the bottom end face 32A of the valve shaft 32. Thus, as the pressure applied to the bottom end face 32A exceeds the thrusting force $P_s$ of the linear solenoid 26, the valve shaft 32 is raised. The pilot valve 30 is opened and the variable orifice 36 is closed, accordingly. As the result, the pressure difference between the pilot chamber pressure $P_p$ and the main chamber pressure $P_m$ is increased abruptly to raise the main valve 22 rapidly The valve shaft 32 is moved to the position at which the thrusting force $P_s$ of the solenoid and the main chamber pressure $P_m$ are balanced and the main valve 22 is moved followingly. As the main valve 22 is moved to broaden the variable orifice 36, the pressure difference is decreased to restrict the movement of the main valve 22. Since the variable orifice 36 has been thus broadened, transit of the oil from the main chamber 18 to the pilot chamber 20 is carried out smoothly to effect restoration of the valve 22 rapidly under the action of the spring 31. Accordingly, the response properties of the main valve 22 at the rising and restoring steps are improved. Similar operation sequence proceeds when a force in the expanding direction (the direction shown by the arrow E) is applied to the piston 16.

Figure 4:
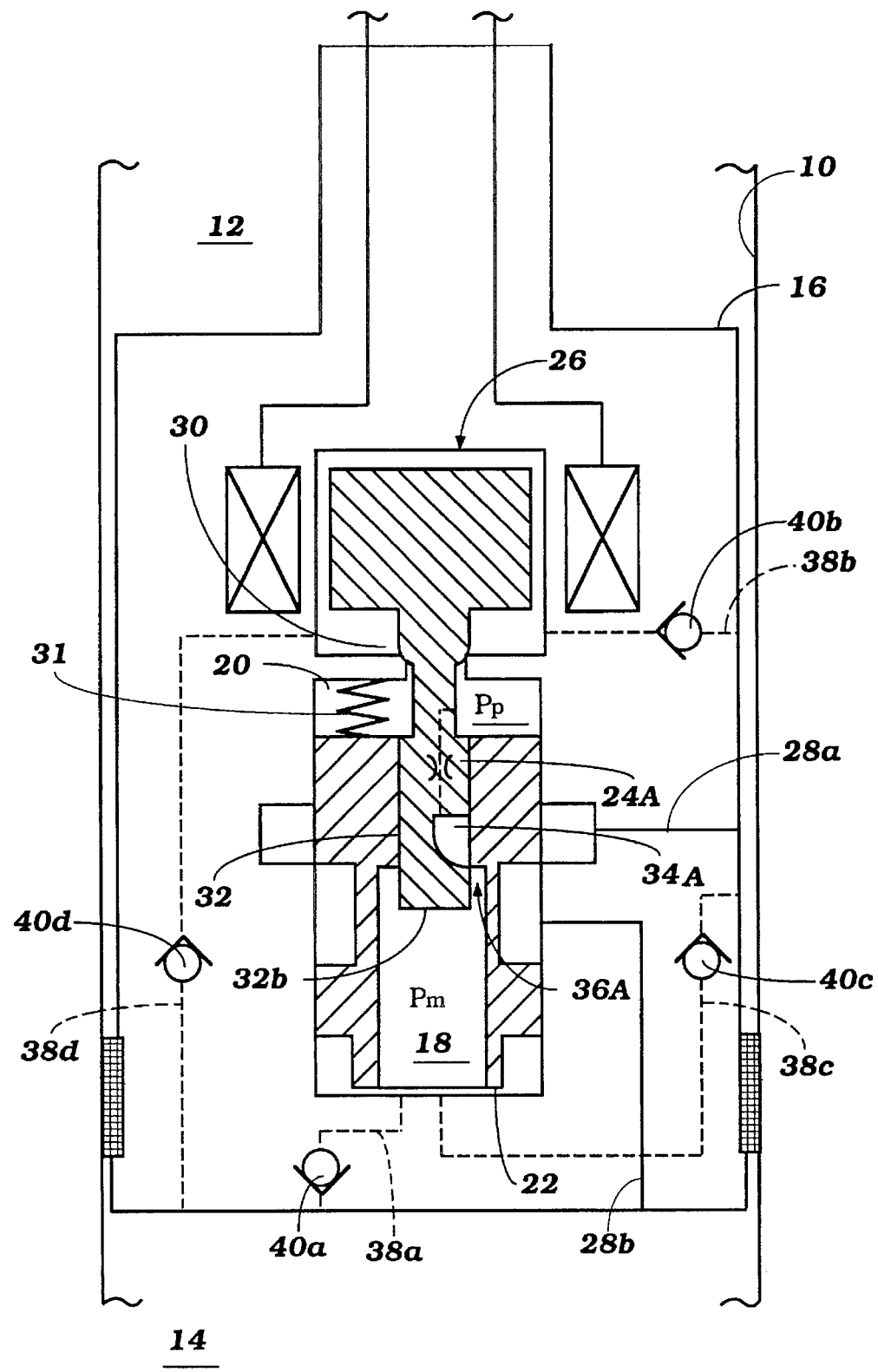
FIG. 4 is a partially schematic cross-sectional view, in part similar to FIGS. 1-3 and shows a third embodiment of the invention.

FIG. 4 is a view showing the principle of a second embodiment. This embodiment of shock absorber including a variable orifice has a fixed orifice 24A added to the passage 34 of the embodiment of FIG. 3. In detail, the passage 34A provided in the valve shaft 32 is shortened and the passage 34A becomes communicated with the pilot chamber 20 through a fixed orifice 24A.

In the embodiment of preceding FIG. 3, the pressure difference is immediately decreased as the variable orifice 36 is broadened so that the main valve 22 cannot be moved further. Accordingly, the position of the main valve 22 is limited by the stroke (stroke distance) of the valve shaft 32 of the pilot system, so that the stroke of the valve shaft 32 cannot take so large range inherently, leading the result that the stroke of the main valve cannot be set to a large value. Accordingly, there is a problem that the adjustable range of the damping power cannot be set in a so large range. The embodiment of FIG. 4 is to solve this problem.

In this embodiment, the pressure difference is rapidly increased by means of a variable orifice 36A to improve the response property of the main valve 22 at the rising step, and on the other hand, the pressure difference between the pilot pressure $P_p$ and the main chamber pressure $P_m$ is lasted. In detail, as the main chamber pressure $P_m$ ascends to raise the valve shaft 32, a variable orifice 36A is closed and the pilot valve 30 is opened to decrease the pilot pressure $P_p$ rapidly. As the result, the main valve 22 is raised rapidly to open the main channel, so that the main valve 22 is raised at high speed. As the result, the response property of the main valve 22 is improved.

Thereafter, as long as the pressure difference between the main chamber pressure $P_m$ and the pilot chamber pressure $P_p$ is kept at a value higher than a predetermined value by means of the pressure reducing function of the fixed orifice 24A, which has influence on the oil flowing therethrough, the main valve 22 is kept moving upwards. The stroke of the main valve 22 is thus increased. As the result, the flow rate of oil flowing between both main oil chambers can be increased, whereby even a small damping power can be generated. Namely, by changing the set thrusting power $P_s$ of the solenoid, the adjustable range thereof covers a larger range from a large damping power to a small damping power.

Figure 5:
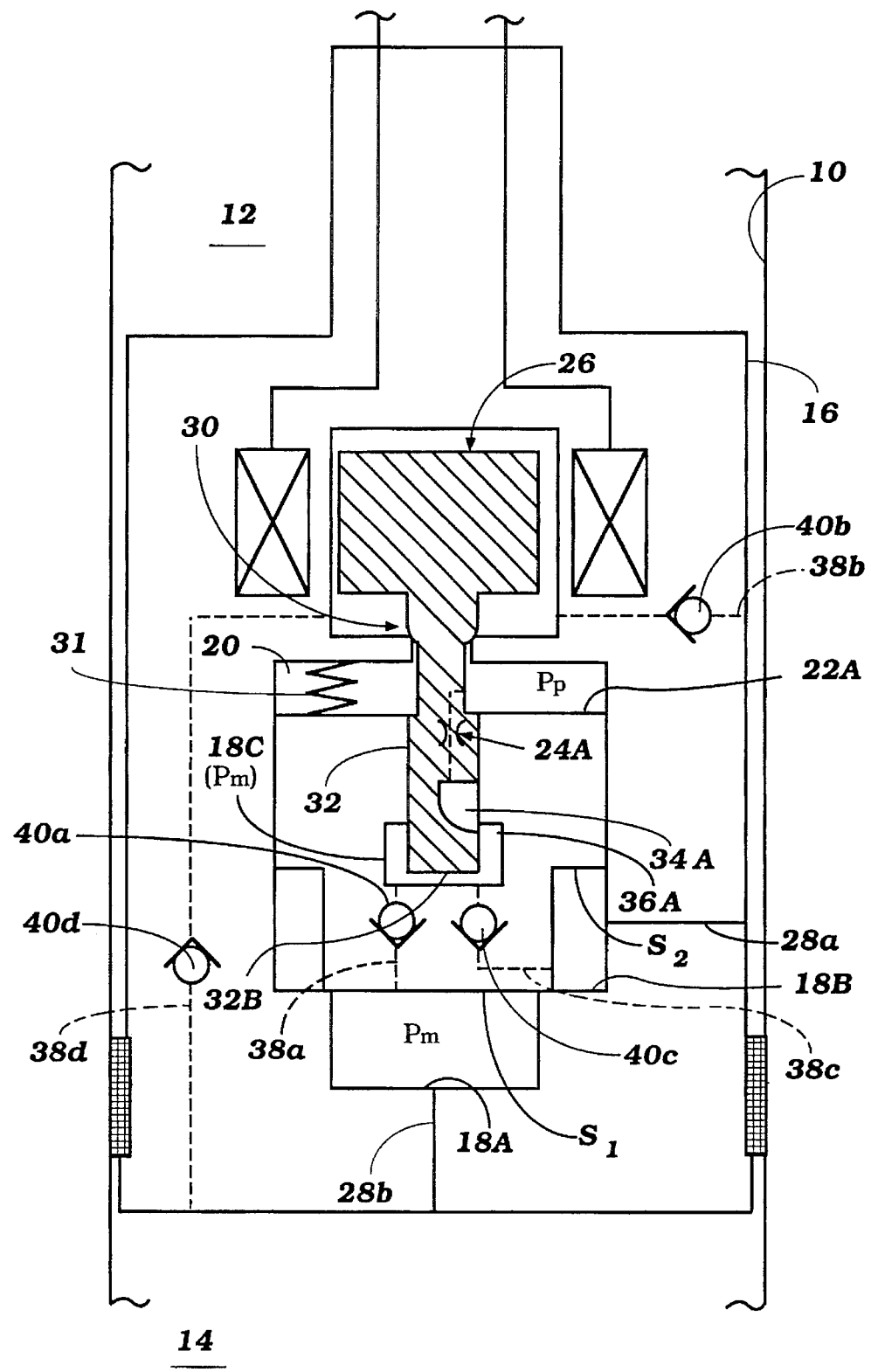
FIG. 5 is a partially schematic cross-sectional view, in part similar to FIGS. 1-4 and shows a fourth embodiment of the invention.

FIG. 5 is a view showing the principle of a third embodiment of shock absorber including a variable orifice interconnecting the main chamber with the pilot chamber. This embodiment comprises a main chamber facing to one end of the main valve 22A and having two partitioned portions 18A and 18B, the pressure-bearing areas of respective portions 18A, 18B are differentiated from each other. In detail, an annular stepped portion is formed on the outer periphery of the lower portion of the main valve 22A, the stepped portion being faced to one of the main chambers 18B, and the bottom end face of the main valve 22A is faced to the other main chamber 18A.

By differentiating the pressure-bearing areas $S_1$, $S_2$ of the main chambers 18A, 18B, the pressure for opening the pilot valve 30 relative to the compressing and expanding directions of the piston 16 can be controlled. With this construction, when it is intended to differentiate the damping powers in the compressing and the expanding direction, it becomes possible to vary the energizing current flowing through the linear solenoid 26 within a narrower range to decrease the generated heat thereby to lower the loading applied on the solenoid 26. Meanwhile, the pressures in the main chambers 18A, 18B are transmitted through one-way valves 40a, 40c to a main pressure chamber 18C to act on the bottom end face 32B of the valve shaft 32 which faces to the main pressure chamber 18C. In addition, by decreasing the diameter of the end face 32B of the valve shaft 32 facing to the main pressure chamber 18C, the driving thrust power required for the linear solenoid 26 can be set to a lower degree, whereby it is realized to speed-up the operation, compactmization of the solenoid 26 and saving of the driving electric current.

Figure 6:
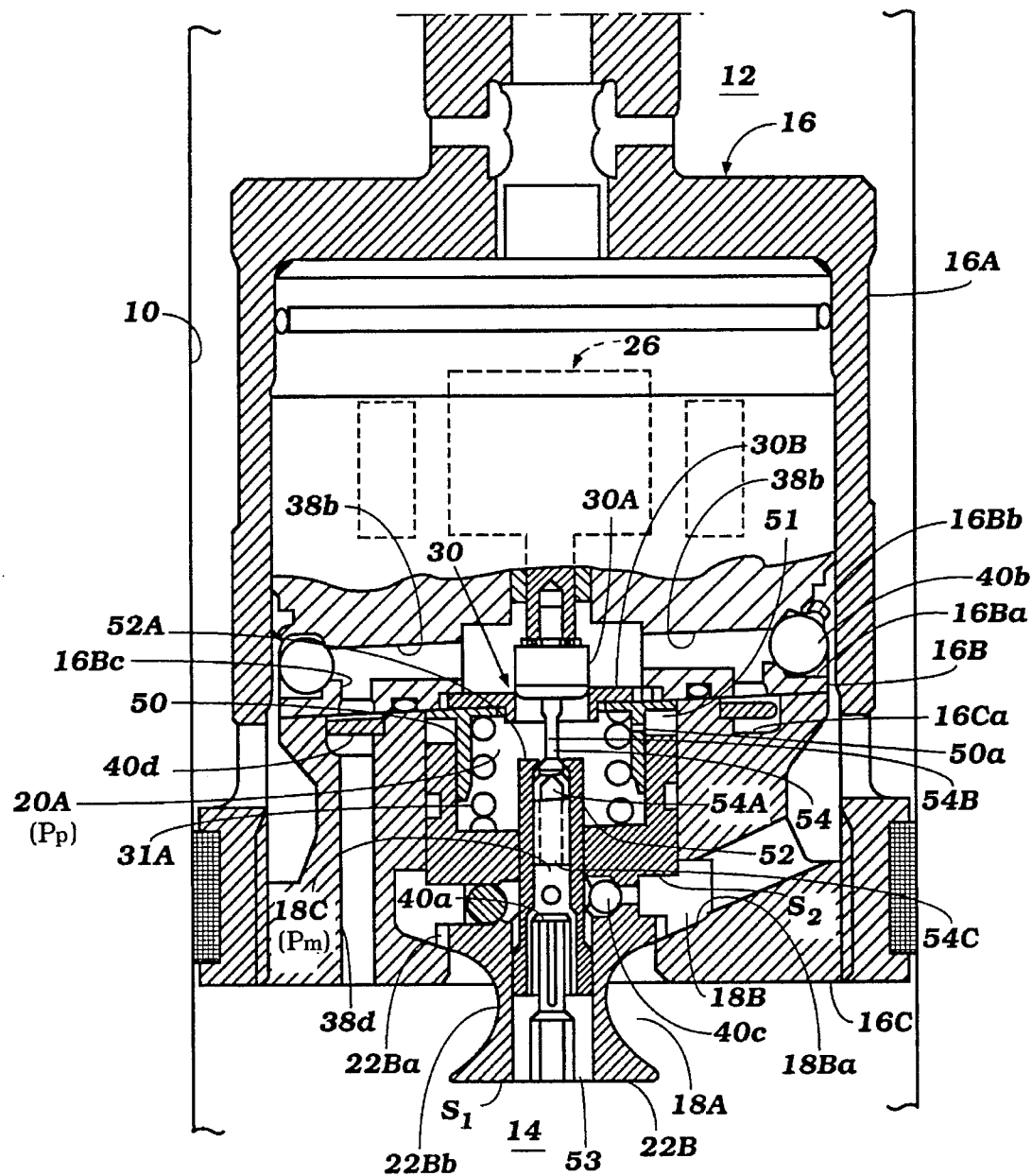
FIG. 6 is a cross-sectional view of a shock absorber constructed in accordance with a fifth embodiment of the invention.

FIG. 6 is a sectional view showing a practical construction example based on the third embodiment of shock absorber including a variable orifice. In this embodiment, the main chamber is partitioned into two portions 18A, 18B, and one of the main chamber 18A serves also as the main oil chamber 14. In the Figure, the valve body 30A of the pilot valve 30 is biased downwards by the plunger of the solenoid 26, and a valve plate 30B serving as the valve seat has a disk shape and is held loosely over the whole peripheral side thereof in the radial direction to be movable. By the movement of the valve plate 30B, irrelevant engagement of the valve seat caused by inalignment between the valve body 30A and the axis is dissolved.

The main valve 22B is formed to have a cylinder having a bottom and having an opening which opens to the pilot chamber 20A. A guide cylinder 50 for the coil spring 31A is slidingly engaged with the interior pheriphery of the main valve 22B and a damper chamber 51 is formed and surrounds the outer periphery of the guide cylinder 50. An orifice 50a for communicating the pilot chamber 20A with the damper chamber 51 is provided through the guide cylinder 50. A slight gap is left between the outer periphery of the guide cylinder 50 and the sliding surface of the main valve 22B. Vibration of the main valve 22B is suppressed by the resistance of flowing oil flowing, through the orifice 50a and the aforementioned gap, between the damper chamber 51 and the pilot chamber 20A.

Meanwhile, the piston 16 is formed of a piston case 16A having an open lower end, a solenoid body 16B and a valve body 16C fitted in the piston case 16A in the described order from the bottom. The solenoid body 16B contains therein the linear solenoid 26, and has plural pilot flow channels 38*b* which extend radially from the pilot valve 30. Each of these pilot flow channels 38*b* has an outer peripheral end at which a ball-charge room 16B*a* is formed to expand the outer pheripheral direction, and a ball for forming a one-way valve 40*b* is charged into the ball-charge room 16B*a*. The open end edge 16B*b* of the ball-charge room 16B*a* is caulked to be inclined slightly bent towards the ball in order to prevent fall-out of the ball to facilitate assembly of the piston 16. The one-way valve 40*b* is opened when the upper main oil chamber 12 is in the low pressure side, and at that time the ball abuts against the interior surface of the piston case 16A.

The main valve 22B is mounted in the valve body 16C from the side facing to the solenoid body 16B, and an annular groove 16C*a* surrounding the main valve 22B is formed on the face of the valve body 16C facing to the solenoid 16B. This annular groove 16C*a* is communicated with the lower main oil chamber 14 through a proper number of pilot flow channels 38*d* extending through the axial direction. The annular groove 16C*a* is also communicated with the pilot flow channels 38*b* located in the solenoid body 16B through a proper number of flow channels 16B*c*. A one-way valve 40*d* is formed by an annular plate valve mounted on this annular groove 16C*a*. The one-way valve 40*d* is opened when the lower main oil chamber 14 is in the lower pressure side, and at that time the plate valve engages with the stepped portion of the annular groove 16C*a* formed on the interior peripheral surface of the groove so that oil flows over the outer periphery of the plate valve.

A cylindrical body 52 is screw-fitted to the main valve 22B from the side of the lower oil chamber 14, and the cylindrical body 52 is fixed by a lock member 53 which is further screwed into the main valve 22B from the downside. The fore end (top end) of the cylindrical body 52 extends into the pilot chamber 20A. A main pressure chamber 18C is defined in the cylindrical body 52. The pressure in the upper main oil chamber 12 is transmitted through a one-way valve 40*c* and the pressure in the lower main oil chamber 14 is transmitted through a bevelled one-way valve 40*a* to the main pressure chamber 18C.

The top end portion of the cylindrical body 52 is converged towards the interior diametral direction to form a converged portion 52A to which an upwardly-extending pin 54, which projects from the interior of the cylindrical body 52, is engaged from the downside. This pin 54 has a lower portion forming a cylinder 54C slidable within the cylindrical body 52 and has a conical upper portion, from the top of which a pin portion 54B extends upwards. This conical portion opposes to the top end converged portion 52A of the cylindrical body 52 from the downside. Meantime, a window 54A communicating through the interior of the cylinder 54C to the main pressure chamber 18C is provided at the vicinity of the outer periphery of the conical portion, so that oil can be flown from the main pressure chamber 18C to the pilot chamber 20A through this window 54A. The fixed position of the cylindrical body 52 is determined so that the pin portion 54B of the pin 54 abuts against the lower face of the valve body 30A of the pilot valve 30 under the condition such that the conical portion forms a variable orifice having an appropriate opening area is defined with the converged portion 52A of the cylindrical body 52.

With this construction, as the pressure in one of the high pressure side main oil chamber 12 or 14 is transmitted through the one-way valve 40*c* or 40*a* to the main pressure chamber 18C by the movement of the piston 16, the pin 54 is pushed upwards. At the same time, the top end of the pin 54 pushes the valve body 30A upwards. Whereupon, the variable orifice in the pilot channel, which is formed by the pin 54 with the converged portion 52A of the cylindrical body 52, is squeezed or closed. The pressure difference between the main chamber pressure $P_p$ and the pilot chamber pressure $P_m$ is thus abruptly increased to raise the main valve 22 at high speed. Although the variable orifice becomes enlarged by the rising of the main valve 22, the pressure difference is kept unchanged since there is a fixed orifice which is formed at the gap between the pin portion 54B and the converged portion 52A at the top of the cylindrical body 52. Accordingly, the stroke of the main valve relative to the moving distance of the pilot valve 30 is increased.

Still referring to FIG. 6, the main valve 22B extends from the opening of the main chamber 18B to the main oil chamber 14. Four pawls 22B*a* provided on the main valve 22B to extending in the radial direction engage with the open edge of the main chamber 18B from the side of the main chamber 18B. At this time, only the pawls 22B*a* engage with the opening edgflow e of the side of the main chamber 18B to close the main channel. Accordingly, even if the gap is under a reduced pressure by the sqeezing effect of the oil flowing through the gap, the force for attracting the main valve 22B to the side toward the main oil chamber 14 is enfeebled. As the result, vibration of the main valve 22B is suppressed to smoothen the operation thereof. The interior bottom face of the main chamber 18B is formed of a smooth conical face 18B*a*. The outer periphery 22B*b* of the main valve 22B extending towards the main oil chamber 14 is formed to be smoothly contiguous with the conical face 18B*a* to smoothen the oil flow.

Figure 7:
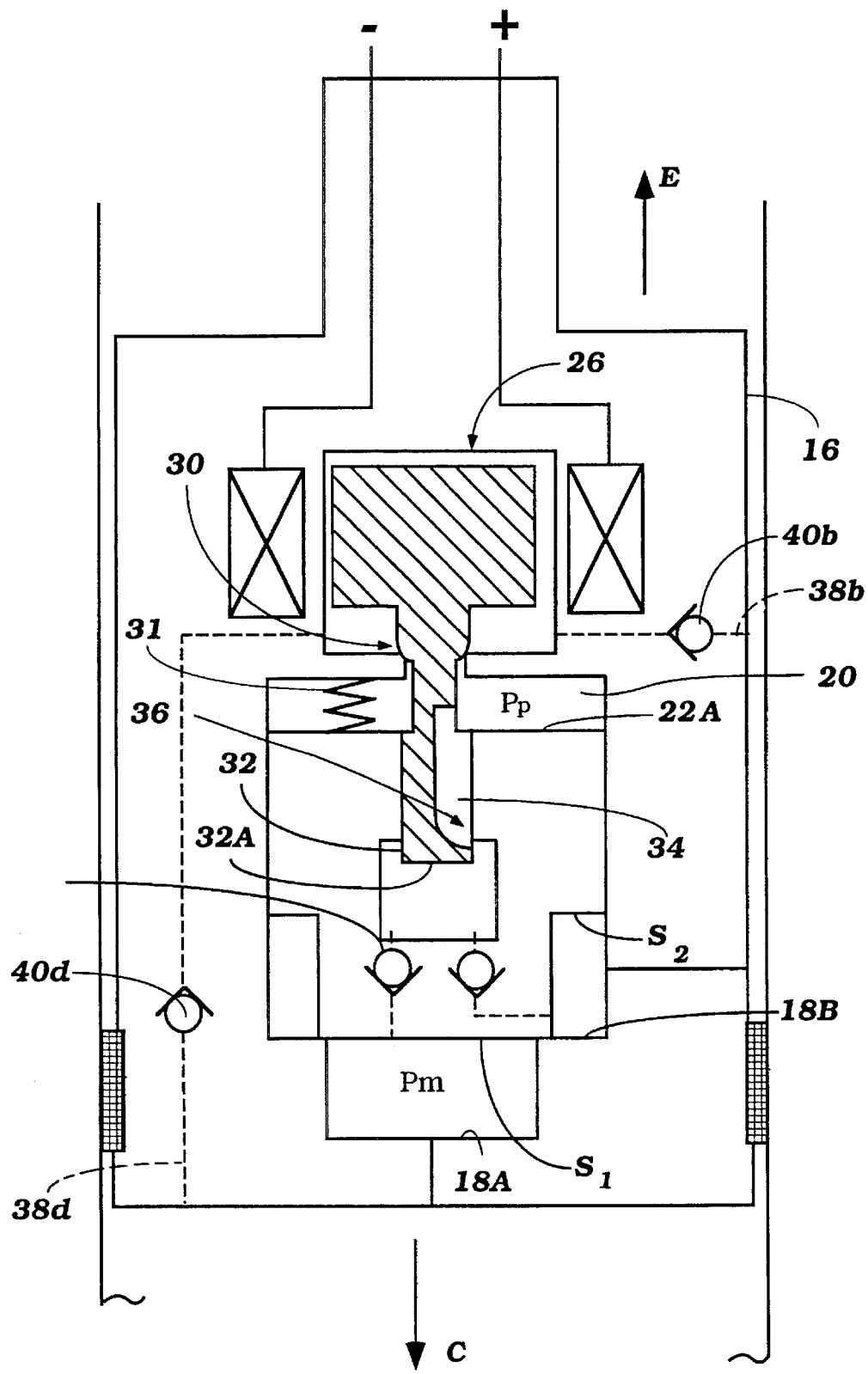
FIG. 7 is a partially schematic cross-sectional view of a shock absorber constructed in accordance with a sixth embodiment of the invention.

FIG. 7 is a view showing the principle of a fourth embodiment of shock absorber including a variable orifice interconnecting the main chamber with the pilot chamber. This embodiment is an improvement of the embodiment of FIG. 3. In this embodiment, an annular stepped portion is formed, similar to the embodiment as shown in FIG. 5, on the end of the main valve 22A at the side of the main chambers 18A, 18B. This stepped portion is faced to one main chamber 18B, and the lower end face of the main valve 22A is faced to the other main chamber 18A. Since the portions or parts other than that described just above is the same as those shown in FIG. 3, the description thereof will not be repeated.

According to this embodiment, similar to that of FIG. 5, the pressure-bearing areas $S_1$, $S_2$ of the lower end face of the main valve 22A and the stepped portion are differentiated to set the pressures for opening the pilot valve 30 in the compressing direction and the expanding direction can be independently set.

Figure 8:
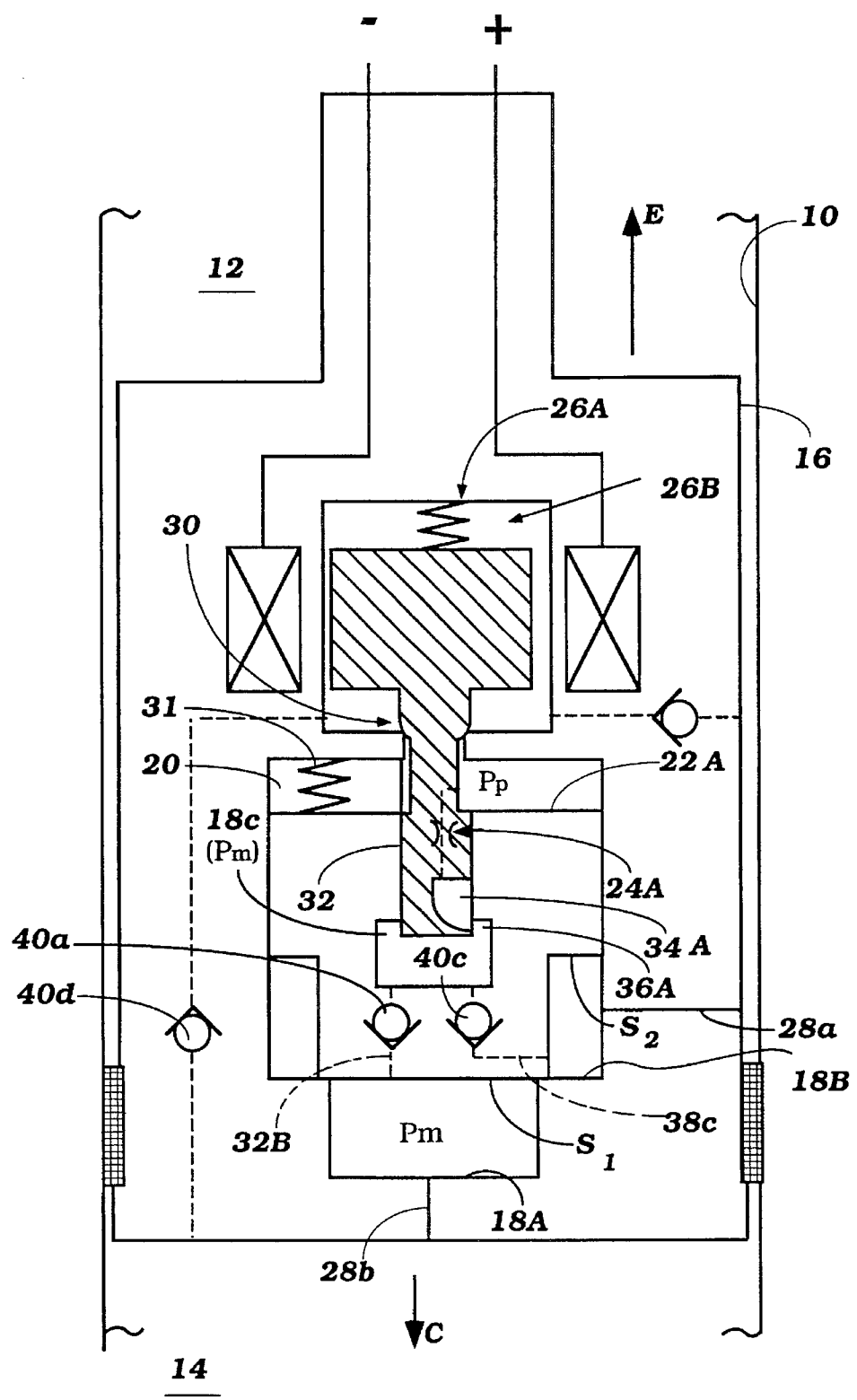
FIG. 8 is a partially schematic cross-sectional view of a shock absorber constructed in accordance with a sixth embodiment of the invention.

FIG. 8 is a view showing the principle of a fifth embodiment of shock absorber including a variable orifice. In this embodiment, the biasing direction of the linear solenoid 26 is reversed to that in the embodiment of FIG. 5. In detail, in the embodiment of FIG. 3, the linear solenoid 26 biases the valve shaft 32 in the direction to close the pilot valve 30. On the contrary, a linear solenoid 26A of the embodiment of FIG. 8 biases the valve shaft 32 in the direction to close the pilot valve 30 by means of a spring 26B, and the linear solenoid 26A attracts the valve shaft 32 in the direction to open the pilot valve 30 upon energization thereof.

As the result, in case where the linear solenoid 26A is deenergized by the failure of the electric circuit, the spring 26B urges the pilot valve 30 in the closing direction, and stable equiribrium is established at the position at which the force of this spring is balanced with the force of the main chamber pressure $P_m$ pushing the end face of the valve shaft 32. Thus, the main valve 22 is held at the position at which the pushing force of the main chamber pressure $P_m$ is balanced with the pushing force of the pilot chamber pressure $P_p$. Accordingly, when a failure occurs in the electric circuit during cruising of the vehicle, this shock absorber is held to exert a damping power which is balanced with the spring force of the spring 26B to make it possible to allow cruising under such condition.

As has been described hereinabove, since a variable orifice (36) having an opening area varied by the relative movement of a pilot valve (30) and a main valve (22) is provided in this invention, the operation speed of the main valve (22) can be increased to improve the response property.

The variable orifice (36) may be provided by a passage (34) formed in the valve shaft (32). By adding a fixed orifice (24A) to the passage (34), it becomes possible to lengthen the storke of the main valve (22) sufficiently.

The main chamber (18) may have a construction to transmit the pressure in the high pressure side main oil chamber (12 or 14) through the one-way valves (40a, 40c). By providing an annular stepped portion at one end of the main valve (22A) and by transmitting different pressures in the main oil chambers (12, 14) respectively on the stepped portion and on the end face of the main valve to differentiate the pressure-bearing areas ($S_1$, $S_2$) of the stepped portion and the end face of the main valve, the damping power may be variably set at the expanding and the compressing directions. In such a case, the end face of the main valve may be faced directly to one of the main oil chamber.

Furthermore, a cylindrical body (52) may be inserted through the main valve (22B) while forming a main pressure chamber 18C therein by the provision of a pin (54) extending from the main pressure chamber 18C to abut against the valve body 30A of the pilot valve 30, whereby a variable orifice is formed by the pin (54) and the cylindrical body (52).

The shock absorber of the present invention, when used on a vehicle such as an automobile, motor bicycles or like, can control independently the damping power at the commpression side and the expansion side depending on the crusing condition, and additionally the damping power can be controlled intermediately of the storoke. Accordingly, the cruising performance of the vehicle can be improved to provide more comfortable feeling to the driver or the rider.

I claim:

1. A shock absorber comprising a cylinder, a piston in said cylinder for defining two main oil chambers in said cylinder, a main oil channel for communicating said two main oil chambers, a main valve for opening and closing said main oil channel, a main chamber facing to one end of the main valve so as to transmit the hydraulic pressure in the high pressure side main oil chamber for biasing said main valve toward the direction for opening said main oil channel, a pilot chamber facing to the other end of said main valve, a pilot valve for releasing the pressure in said pilot chamber to the low pressure side main oil chamber, a linear solenoid for biasing said pilot valve in a closing direction, a variable orifice having an opening area varied solely by the relative positions of said pilot and main valves, and a pilot flow channel extending from said main chamber through the variable orifice and through said pilot valve to the low pressure side main oil chamber.

2. The shock absorber as recited in claim 1, wherein the pilot valve comprises a valve shaft having one end biased by said linear solenoid and another end extending through said main valve to face to said main chamber, said valve shaft including a passage having one end opened through a variable orifice to said main chamber and the other end opened to said pilot chamber and defining at least in part the pilot flow channel.

3. The shock absorber as recited in claim 2, wherein said passage defined in said valve shaft is provided with a fixed orifice interposed between said variable orifice and said pilot chamber.

4. The shock absorber as recited in claim 1, wherein an annular stepped portion is formed on the one end face of said main valve, said stepped portion and said one end face of the main valve being faced to a respective main oil chamber for receiving the pressure of the respective main oil chamber, and wherein the pressures in these main oil chambers are transmitted through respective one-way valves to the main chamber, the pressure-bearing area of said stepped portion being different than the pressure-bearing area of the one end face of the main valve.

5. The shock absorber as recited in claim 4, wherein the one end face of the main valve is directly faced to one main oil chamber to allow said one main oil chamber to serve the main chamber, and wherein the pressure in the other main oil chamber is transmitted to the main chamber which is faced to the stepped portion.

6. The shock absorber as recited in claim 5, wherein a cylindrical body extending from the one main oil chamber to face to the pilot chamber is inserted through said main valve, a lock member is thrusted into the cylindrical body from the one main oil chamber so as to define the main chamber, and a pin is provided to engage with a valve body of the pilot valve, said pin having a conical-shaped portion at its end to define a variable orifice with said cylindrical body, a fixed orifice being formed by a pin portion of the pin and a converged portion of the cylindrical body at the open end thereof.

7. The shock absorber as recited in claim 6, wherein the cylindrical body, the pin and the lock member are pre-assembled in the main valve.

8. A shock absorber comprised of a pair of relatively movable components defining a first fluid chamber, a second fluid chamber, a first conduit interconnecting said fluid chambers for flow therebetween including a control valve for controlling the flow through said first conduit, said control valve having a first surface exposed to the pressure in said first fluid chamber and a second surface opposed to said first surface and exposed to the pressure in a pilot chamber, a pilot valve for selectively communicating said pilot chamber with a lower pressure area, a linear electrical solenoid for applying a predetermined closing force upon said pilot valve, and a second conduit containing a variable orifice interconnecting said first fluid chamber to said pilot chamber for transmitting therebetween, the effective area of said variable orifice being determined solely by the position of at least one of said valves relative to the other.

9. The shock absorber of claim 8, wherein the effective area of the variable orifice is controlled by the relative positions of the valves.

10. The shock absorber of claim 8, wherein the shock absorber is a double-acting shock absorber and wherein the first and second fluid chambers are defined on opposite sides of one of the relatively movable members.

11. The shock absorber of claim 10, wherein the effective area of the variable orifice is controlled by the relative positions of the valves.

12. The shock absorber of claim 10, wherein the control valve is supported within the one relatively movable member.

13. The shock absorber of claim 12, wherein the control valve controls the flow in both directions between the chambers.

14. The shock absorber of claim 12, wherein the pilot valve has a portion extending through the control valve and subjected to the pressure in the first fluid chamber.

15. The shock absorber of claim 14, wherein the variable orifice is formed in part by the pilot valve extending portion.

16. The shock absorber of claim 15, wherein the control valve controls the flow in both directions between the chambers.

17. The shock absorber of claim 16, wherein the control valve first surface is exposed to the pressure in a main fluid chamber and wherein the main fluid chamber is connected to the first and second fluid chambers by respective passages containing check valves.

18. The shock absorber of claim 17, wherein the check valve passages are formed in the control valve.

19. The shock absorber of claim 18, wherein the control valve has a stepped end portion having an end face and a shoulder extending therearound and wherein the shoulder is exposed to the pressure in one of the fluid chambers and the end face is exposed to the pressure in the other of the fluid chambers.

20. The shock absorber of claim 16, wherein a pair of check valved passages interconnect the pilot chamber, downstream of the pilot valve with the first and second fluid chambers wherein the pressure is dumped from the pilot chamber to the fluid chamber not being pressurized.

21. The shock absorber of claim 20, wherein the check valve passages are formed in the one relatively movable component.

22. The shock absorber of claim 21, wherein the control valve's first surface is exposed to the pressure in a main fluid chamber and wherein the main fluid chamber is connected to the first and second fluid chambers by respective passages containing check valves.

23. The shock absorber of claim 22, wherein the passages containing the check valves are formed in the one relatively movable member.

24. The shock absorber of claim 22, wherein the passages containing the check valves are formed in the control valve.

25. The shock absorber of claim 24, wherein the control valve has a step end portion having an end face and a shoulder extending therearound and wherein the shoulder is exposed to the pressure in one of the fluid chambers and the end face is exposed to the pressure in the other of the fluid chambers.

26. The shock absorber of claim 8, further including a fixed orifice in series flow relationship with the variable orifice.

27. A shock absorber comprised of a pair of relatively movable components defining a first fluid chamber, a second fluid chamber, a first conduit interconnecting said fluid chambers for flow therebetween and including a control valve for controlling the flow through said first conduit, said control valve having a first surface exposed to the pressure in said first fluid chamber and a second surface opposed to said first surface and exposed to the pressure in a pilot chamber, a pilot valve for selectively communicating said pilot chamber with a lower pressure area, a linear electrical solenoid for applying a predetermine closing force upon said pilot valve, a second conduit separate from said control valve interconnecting said first chamber to said pilot chamber for transmitting pressure therebetween, and a portion of said pilot valve extending through said control valve for direct exposure to the pressure in said first fluid chamber for urging said pilot valve toward an open position.

28. The shock absorber as defined by claim 27, wherein the second conduit extends at least in part through the portion of the pilot valve.

29. The shock absorber as defined by claim 28, wherein the portion of the second conduit passing through the pilot valve portion comprises a variable orifice the size of which depends upon the respective positions of the pilot valve and the control valve.

30. The shock absorber as defined by claim 29, further including a fixed orifice in series flow relationship with the variable orifice and formed in the pilot valve portion.

31. The shock absorber as defined by claim 27, wherein the second conduit extends through the control valve and includes a fixed orifice.

\* \* \* \* \*